United States Patent
Hedayat et al.

(10) Patent No.: US 7,977,939 B2
(45) Date of Patent: Jul. 12, 2011

(54) NON-CONTACT ENGINE PARAMETER SENSOR

(75) Inventors: Kayvan Hedayat, Weston, MA (US); Norman Poirier, Raynham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/873,901

(22) Filed: Oct. 17, 2007

(65) Prior Publication Data
US 2008/0116895 A1 May 22, 2008

Related U.S. Application Data

(60) Provisional application No. 60/829,773, filed on Oct. 17, 2006.

(51) Int. Cl.
*G01R 33/04* (2006.01)
*F02P 17/00* (2006.01)
(52) U.S. Cl. ......... 324/246; 324/253; 324/258; 324/378
(58) Field of Classification Search .................. 324/529, 324/378, 228, 232, 244, 246, 253, 258, 260, 324/262, 402; 123/617; 73/862.331, 862.333
See application file for complete search history.

(56) References Cited

U.S. PATENT DOCUMENTS

| | | | |
|---|---|---|---|
| 4,687,994 A | 8/1987 | Fulkerson et al. | |
| 5,672,812 A * | 9/1997 | Meyer | 73/35.07 |
| 5,769,043 A * | 6/1998 | Nitkiewicz | 123/90.11 |
| 5,879,297 A * | 3/1999 | Haynor et al. | 600/407 |
| 6,105,616 A * | 8/2000 | Sturman et al. | 137/625.65 |
| 6,222,363 B1* | 4/2001 | Cripe | 324/253 |
| 6,553,847 B2 | 4/2003 | Garshelis | |
| 6,771,066 B2* | 8/2004 | Rippingale | 324/253 |
| 6,994,077 B2 | 2/2006 | Kobayashi et al. | |
| 2004/0008022 A1* | 1/2004 | Viola et al. | 324/117 R |
| 2004/0200273 A1* | 10/2004 | Giustino et al. | 73/146 |
| 2007/0157746 A1* | 7/2007 | Perry | 73/866.5 |

* cited by examiner

*Primary Examiner* — Timothy J Dole
(74) *Attorney, Agent, or Firm* — Grossman, Tucker, Perreault & Pfleger, PLLC

(57) ABSTRACT

A system and method for non-contact engine parameter sensing. A magnetized engine component establishes a magnetic field that varies in response to stress imparted within the engine. A magnetic field sensing element spaced from the magnetized engine component is configured to provide an output indicative of a state of combustion in response to the magnetic field.

5 Claims, 7 Drawing Sheets

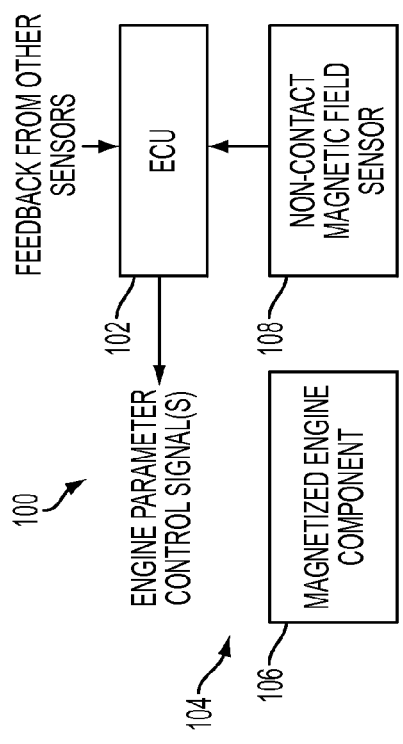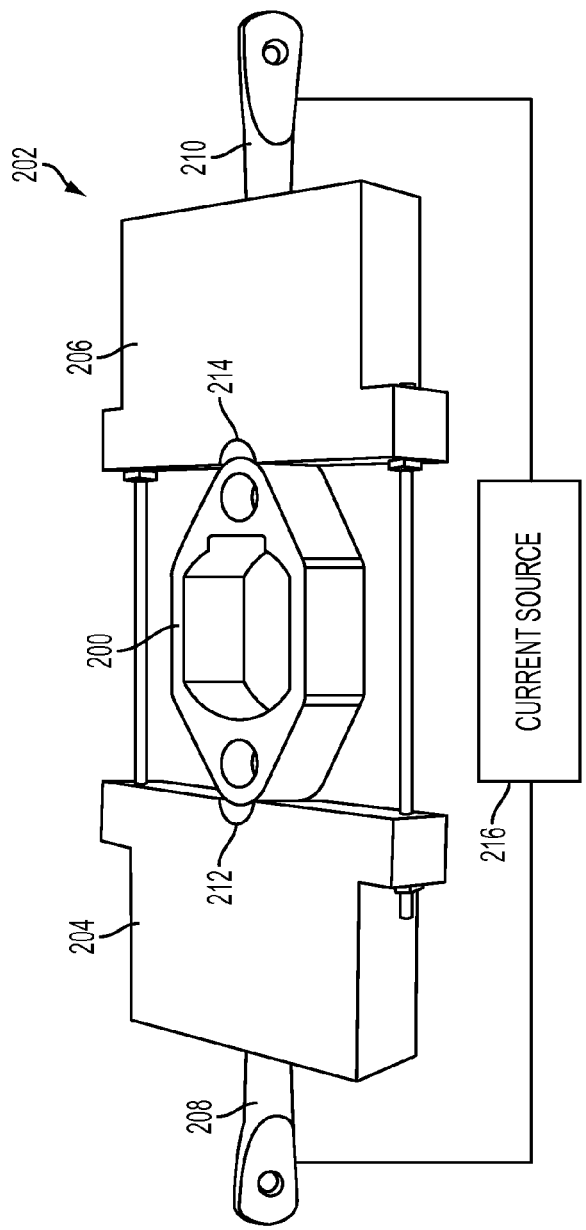

NON-CONTACT ENGINE PARAMETER SENSOR

CROSS-REFERENCE TO RELATED APPLICATIONS

This application claims the benefit of the filing date of U.S. Provisional Patent Application Ser. No. 60/829,773 filed Oct. 17, 2006 the teachings of which are hereby incorporated herein by reference.

TECHNICAL FIELD

This disclosure relates to sensors, and more particularly to a non-contact engine parameter sensor.

BACKGROUND

A diesel engine intakes air, compresses it, and then injects the fuel directly into the combustion chamber (direct injection). The heat of the compressed air ignites the fuel in the combustion chamber. The injector may be mounted to a fuel injector clamp in an orientation that allows injection of fuel into the combustion chamber.

Diesel engine operating parameters may be monitored and controlled for efficient operation. For example, to achieve desired operating conditions (e.g. power, efficiency, and/or pollution control) in a diesel engine, it may be advantageous to continuously monitor the point in the crankshaft rotation cycle at which the onset of combustion takes place. Unlike a gasoline engine, which determines the "start of combustion" by the spark timing, the diesel "start of combustion" is a function of several variables including cylinder compression, fuel injection timing, engine temperature, fuel-to-air ratio, and other operating parameters.

BRIEF DESCRIPTION OF THE DRAWINGS

Features and advantages are set forth by the description of embodiments consistent therewith, which description should be considered in combination with the accompanying drawings, wherein:

FIG. 1 is a block diagram of the control system of an exemplary embodiment of a system consistent with the present disclosure;

FIG. 2 is an exemplary embodiment for inducing magnetization in a fuel injector clamp consistent with the present disclosure;

DETAILED DESCRIPTION

Figure 3:
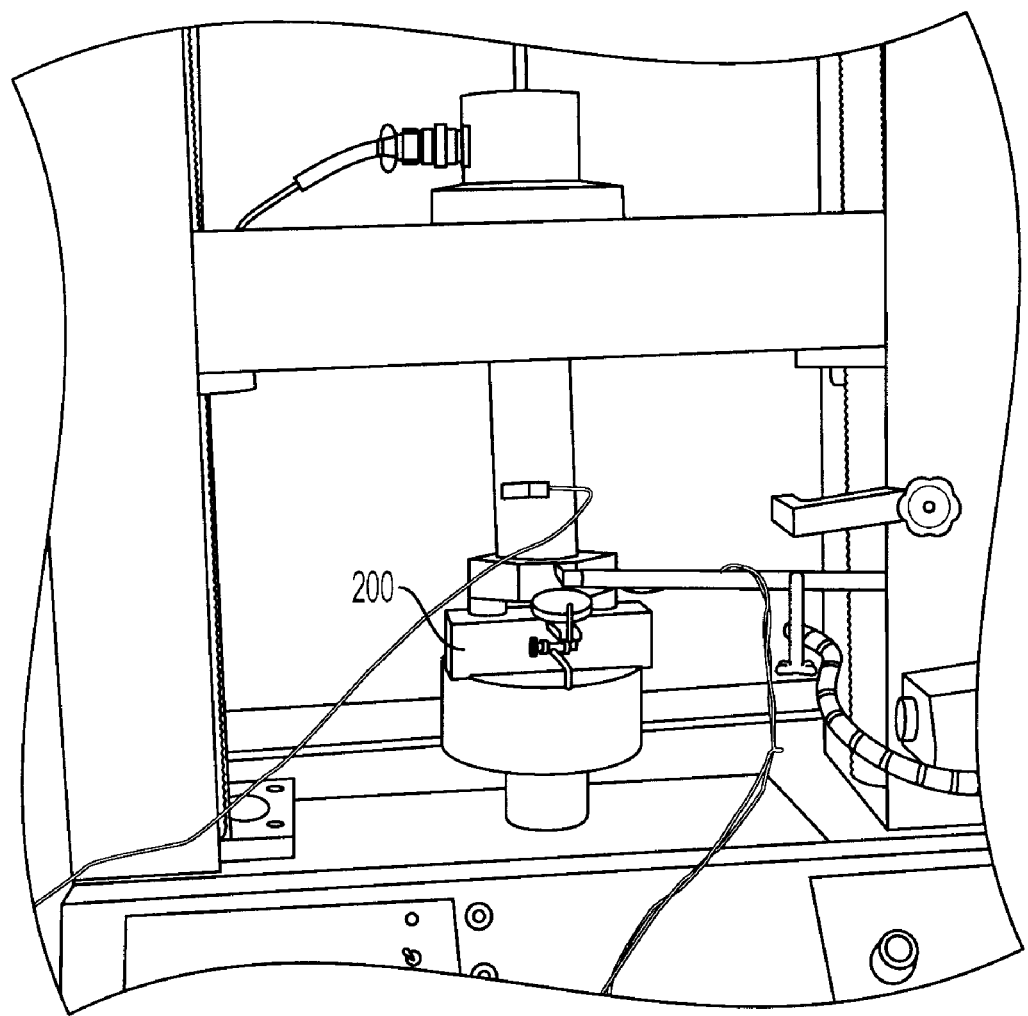
FIG. 3 is a press used in an exemplary embodiment consistent with the present disclosure to age a magnetized engine component.

The description provided herein is with reference to various exemplary embodiments. It is to be understood that the embodiments described herein are presented by way of illustration, not of limitation. A system consistent with the present disclosure may be incorporated into a wide variety of systems without departing from the spirit and scope of the invention.

Turning now to FIG. 1, there is shown in block diagram form one exemplary embodiment of a system 100 consistent with the present disclosure. As shown, the system 100 may include an electronic control unit (ECU) 102, and sensor 104 configuration including magnetized engine component 106 and a non-contact magnetic field sensor component 108. As used, herein the term "non-contact" when used to describe a sensor refers to a sensor wherein a separate sensor component is not in physical contact with the sensed object. Non-contact sensing is particularly advantageous in providing reliability over the long service life of a diesel motor.

In general, stresses on the magnetized engine component 106 may be proportional to a parameter of interest, and may cause changes in the magnetic field established by the component. The non-contact magnetic field sensor component 108 may sense the stress-induced changes in the magnetic field and provide a corresponding output indicative of the state of the parameter of interest. The output may be provided to the ECU 102, e.g. along with feedback from other sensors. The ECU may provide one or more control signals for controlling one or more engine parameters at least partially in response to the output of the sensor 108.

The magnetized engine component may be any engine component on which stress is imparted that is proportional to the parameter of interest. In one exemplary embodiment consistent with the present disclosure, the magnetized engine component 106 may be a fuel injector clamp configured for mounting a fuel injector in an orientation that allows injection of fuel into an engine combustion chamber. A variety of fuel injector clamp configurations for mounting a fuel injector are well known in the art. It has been determined that stresses on the fuel injector clamp may be directly proportional to pressure inside the cylinder. The stress on the magnetized clamp produced by combustion causes a change in the magnetic field established by the clamp. A non-contact sensor portion 108 of the sensor configuration may sense changes in the magnetic field established by the clamp and provide an output indicative of a combustion state, e.g. the start of combustion, in response to such changes.

The magnetized engine component 106 may be formed by magnetizing the entirety or one or more regions of the component. The component 106 may be formed of a magnetoelastic material capable of maintaining a magnetization induced therein following repeated application of stress and returning the magnetization when the stress is removed. A variety of materials exhibiting these properties are well known to those of ordinary skill in the art. Some exemplary materials for forming the component are described in detail in U.S. Pat. No. 6,553,847, the teachings of which are incorporated herein by reference.

The magnetic field sensor 108 may include known sensor components known to those of ordinary skill in the art. In one embodiment, for example, the magnetic field sensor may include one or more fluxgate sensors for the sensing stress-induced changes in the field produced by the magnetized component. Hall Effect sensors may also or alternatively be used depending on the level of the sensed field.

As stress is applied to the magnetized component 106 in any direction, the magnetization of the component may be skewed from its original position at zero stress resulting in a change in magnitude of one or more vector components of the magnetic field. The change in the vector components may be proportional to the applied stress. The sensor 108 may sense the magnitude of the vector component and provide an output signal representative of the stress applied to the magnetized component. In one embodiment, the component 106 and sensor 108 may be configured such that the sensor provides a non-zero output at zero stress to allow for diagnostic testing to ensure proper magnetization, installation, and/or calibration of the sensor configuration 104.

Turning now to FIG. 2, there is illustrated one exemplary system and method for inducing a magnetization in a fuel injector clamp 200 to form a magnetized engine component consistent with the present disclosure. In general, the illustrated exemplary embodiment establishes a magnetization in the fuel injector clamp 200 using a magnetizing fixture 202 for providing a current through the clamp. The magnetizing fixture includes first 204 and second 206 fixture components including first 208 and second 210 electrodes, respectively. The fixture components 204, 206 may be positioned on opposite sides of the clamp 200 with ends of the clamp disposed in associated contact notches 212, 214 in the fixture components. The fixture components may be joined about the clamp 200 with appropriate fasteners.

A current source 216 may be coupled to the electrodes 208 and 210 for establishing current flow from one of the components 204, 206, through the clamp 200 and to the other of the components 204, 206. The current flow through the clamp magnetizes the clamp 200. The magnitude of the field induced in the clamp may depend on the requirements of the intended application. In one embodiment, the clamp 200 may be magnetized in the fixture 202 using 10 kA pulses.

It is to be understood that the illustrated embodiment shows only one of the magnetization directions that will result in the desired magneto-elastic effects for stress measurement. Magnetization could be also accomplished by applying current through the other faces of the clamp or winding the clamp as if it were a toroidal core and magnetizing with current through this winding.

After magnetization, the magnetized engine component may be "aged" to stabilize the magnetic response of the structure. In one embodiment wherein the component is a fuel injector clamp 200, for example, the clamp may be aged with ten cycles of 20 kN produced with a press as shown in FIG. 3.

Figure 4:
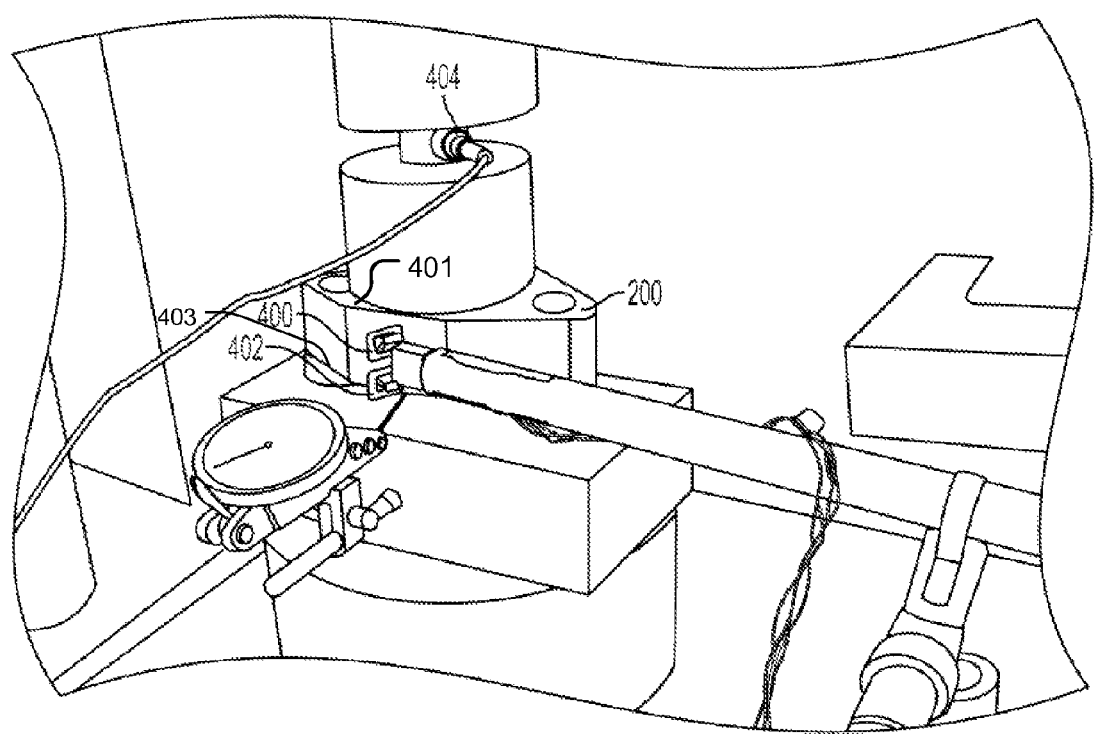
FIG. 4 is an exemplary embodiment of the measurement system of the present disclosure.

As shown best in FIG. 4, the mechanism may be instrumented with a pair of flux gate coils 400, 402, positioned adjacent the top 401 and bottom 403 of the mechanism, respectively, and connected to a flux gate magnetometer for magnetic measurements (other magnetic sensors may be used in place of the coils) and a load cell 404 for pressure measurements. The two flux gate coils 400, 402 may be connected in a differential mode. This may be done for two purposes. Firstly, the magnetic field produced is differential in that the top 401 of the mechanism is under a compressive force, while the bottom 403 is under a tension force, thus the magnetic fields produced are opposite in polarity. Secondly, the differential connection of the coils 400, 402 will tend to reject common mode fields (noise), which may be produced by other nearby devices.

Figure 5:
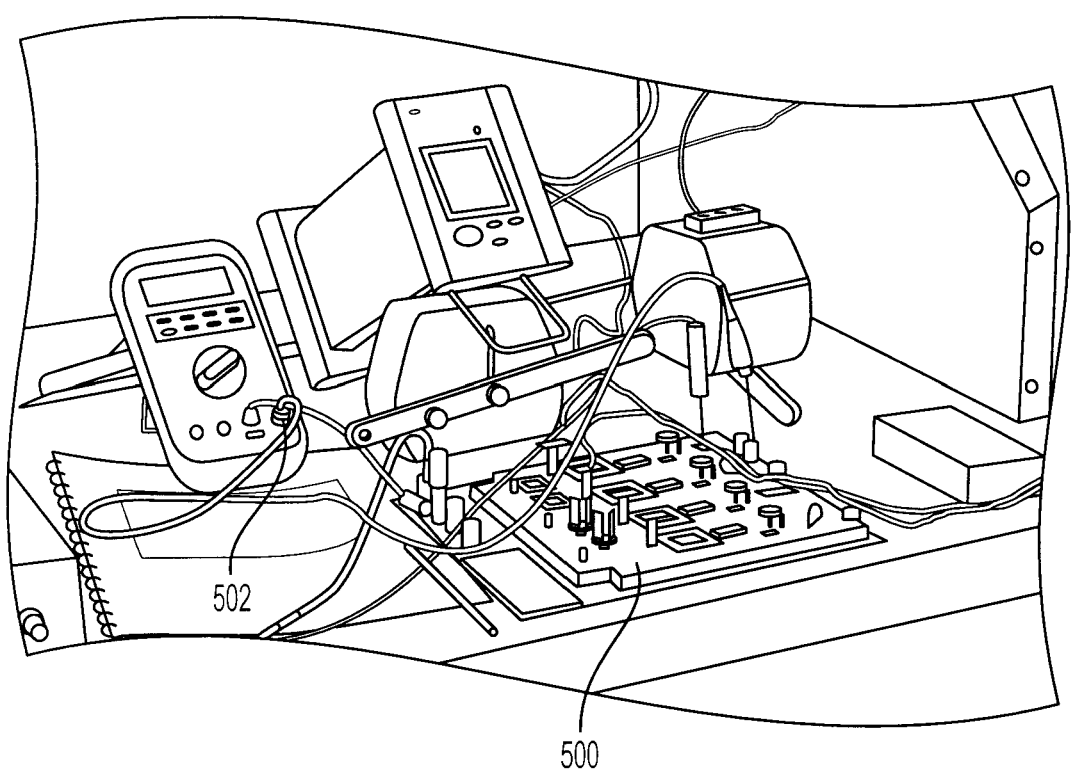
FIG. 5 is an exemplary embodiment of a data acquisition system for evaluation of the measurement system consistent with the present disclosure.
Figure 6:
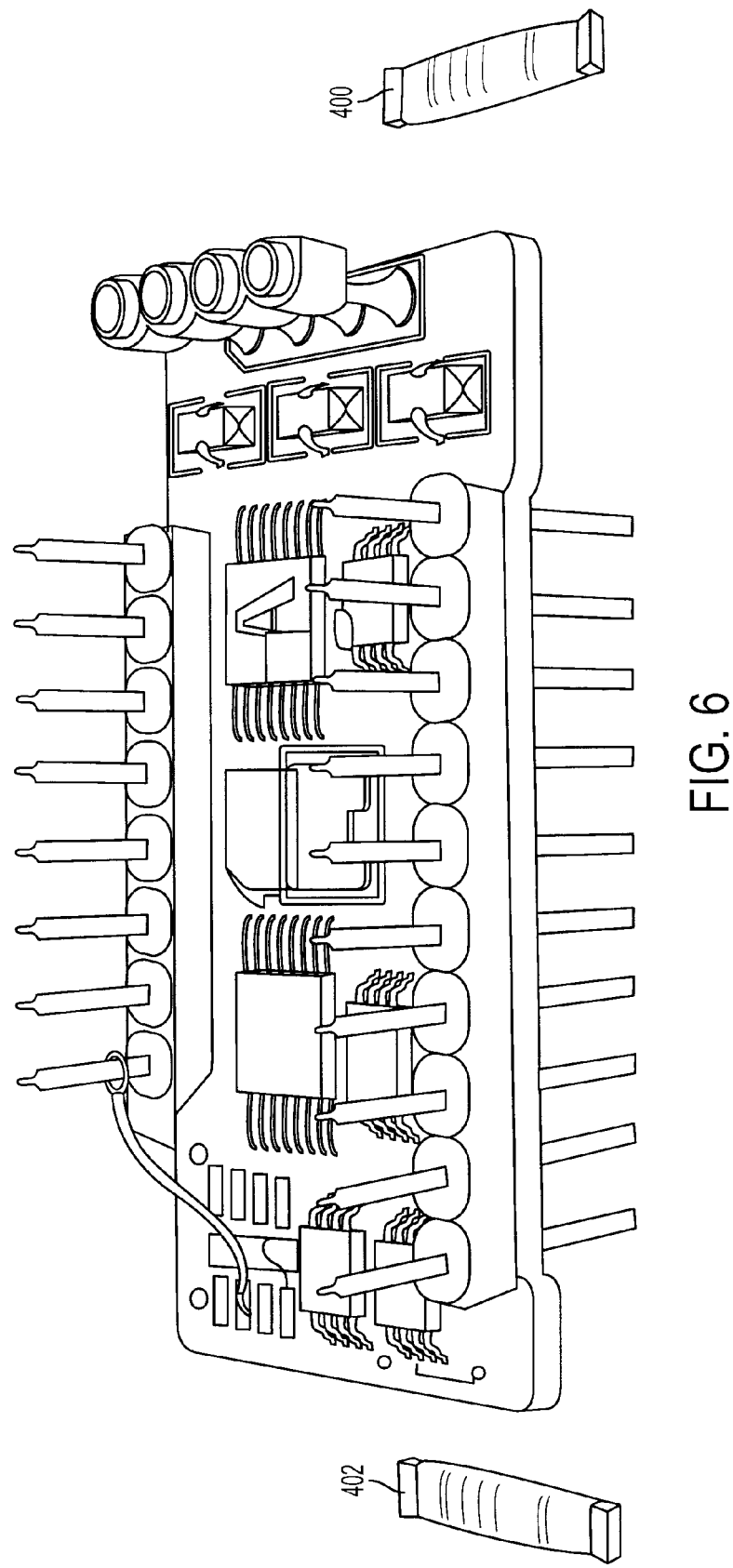
FIG. 6 is an exemplary embodiment of magnetometer circuit consistent with the present disclosure.
Figure 7:
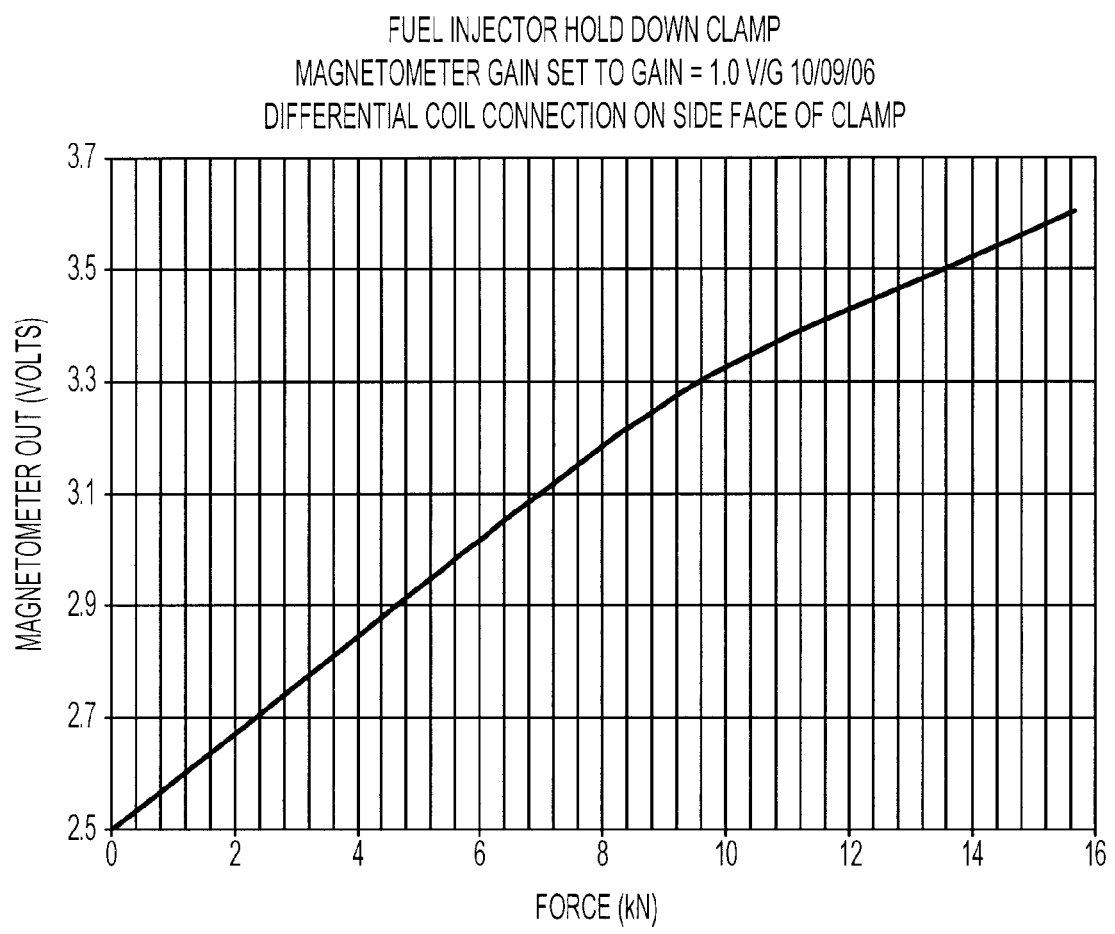
FIG. 7 is a graph showing response of curve of an embodiment of the present disclosure.
Figure 8:
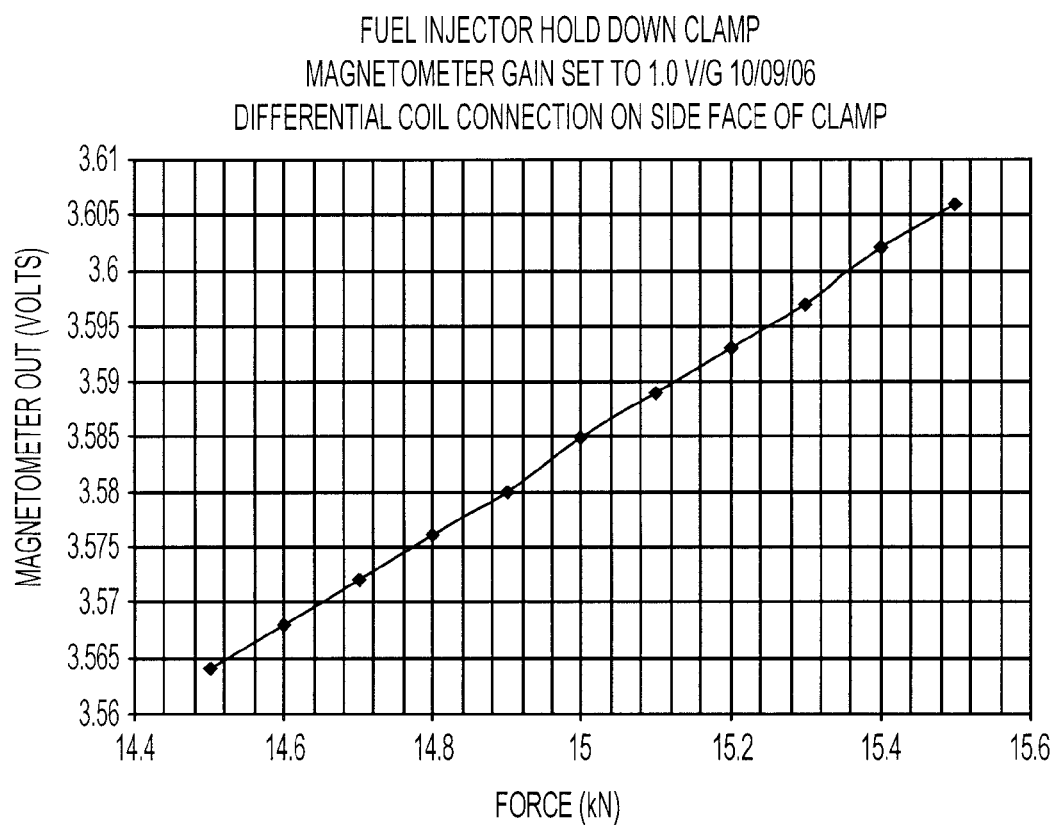
FIG. 8 is a graph showing the response curve of an embodiment of the present disclosure.

FIG. 5 shows an exemplary experimental data acquisition setup for evaluation of system performance. This system includes of a "white board" magnetometer 500 with power supply, a multimeter 502, a load cell with its signal conditioning, and a press. FIG. 6 shows one exemplary embodiment of a non-ASIC discrete magnetometer circuit with the two associated flux gate coils. FIG. 7 shows the response of the system of FIG. 5 from 0 to 16 kN (output was set to 2.50 Volts at 0.0 kN) and FIG. 8 shows a narrow range of the output response measured over a range of 14.5 to 15.5 kN and taken on the opposite face of the fixture.

In summary, there is provided a non-contact engine parameter sensor including a magnetized engine component and a non-contact magnetic sensor component. Stress-induced changes in the magnetic field established by the engine component are sensed by the sensor component, which provides an output proportional to the stress. In one embodiment, the magnetized engine component may be a fuel injector clamp, and combustion induced stresses on the clamp may be sensed by the sensor component to provide an indication the state of combustion, e.g. start of combustion or other combustion state.

According to one aspect of the disclosure, there is provided a system and method including magnetizing a fuel injector clamp for magneto elastic sensing of stresses which indicate cylinder pressure. According to another aspect of the disclosure there is provided a system and method including magnetizing a fuel injector clamp by passing current through the clamp in any direction or putting the clamp in a magnetizing field such as solenoid. According to another aspect of the disclosure there is provided a system and method including sensing stress gradients in a fuel injector clamp, for example sensing regions of compressive and tensile stresses simultaneously to maximize magnetic output. According to another aspect of the disclosure there is provided a system and method including using a fuel injector clamp structure as a self-shielding mechanism against external magnetic fields. According to another aspect of the disclosure there is provided a system and method including use of two or more sensing elements to measure field gradients in this around a magnetized fuel injector clamp to reject external constant fields.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus:
   a magnetized engine component, said magnetized engine component being stationary with respect to the engine and establishing a first magnetic field at a top thereof having a first polarity and a second magnetic field at a bottom thereof having a second polarity, said first polarity being the opposite of said second polarity, said first and second magnetic fields varying in response to stress imparted to said component by combustion within the engine; and
   a magnetic field sensing element spaced from and not in physical contact with said magnetized engine component, said magnetic field sensing element being configured to sense changes in said first and second magnetic fields to provide an output proportional to said stress imparted by said combustion within the engine to indicate a state of said combustion within the engine,
   wherein said magnetic field sensing element comprises first and second fluxgate sensors connected in differential mode, said first fluxgate sensor being positioned adjacent said top of said magnetized engine component and said second fluxgate sensor being positioned adjacent said bottom of said magnetized engine component.

2. The apparatus of claim 1, wherein the magnetized engine component is a fuel injector clamp configured for mounting a fuel injector in an orientation that allows injection of fuel into a combustion chamber.

3. A method of determining a combustion state of an engine comprising:

sensing first and second magnetic fields established by a magnetized engine component using a first and second fluxgate sensors connected in differential mode and not in physical contact with said engine component, said first fluxgate sensor being positioned adjacent a top of said magnetized engine component to sense said first magnetic field and said second fluxgate sensor being positioned adjacent a bottom of said magnetized engine component to sense said second magnetic field, said first magnetic field and said second magnetic field having opposite polarities; said first and second magnetic fields varying in proportion to said combustion state; and providing an output in response to said first and second magnetic fields, said output being indicative of said combustion state.

4. An apparatus comprising:

a magnetized engine component, said magnetized engine component being stationary with respect to the engine and establishing a first magnetic field at a top thereof having a first polarity and a second magnetic field at a bottom thereof having a second polarity, said first polarity being the opposite of said second polarity, said first and second magnetic fields varying in response to stress imparted to said component by combustion within the engine; and a magnetic field sensing element spaced from and not in physical contact with said magnetized engine component, said magnetic field sensing element being configured to sense changes in said first and second magnetic fields to provide an output proportional to said stress imparted by said combustion within the engine to indicate a state of said combustion within the engine; and an electronic control unit (ECU), said ECU being configured to provide a control signal for controlling at least one engine parameter in response to said output, wherein said magnetic field sensing element comprises first and second fluxgate sensors connected in differential mode, said first fluxgate sensor being positioned adjacent said top of said magnetized engine component and said second fluxgate sensor being positioned adjacent said bottom of said magnetized engine component.

5. The apparatus of claim 4, wherein the magnetized engine component is a fuel injector clamp configured for mounting a fuel injector in an orientation that allows injection of fuel into a combustion chamber.

* * * * *